Oct. 27, 1953  D. H. MONTGOMERY  2,656,587
MACHINE TOOL
Filed May 14, 1948  3 Sheets-Sheet 1
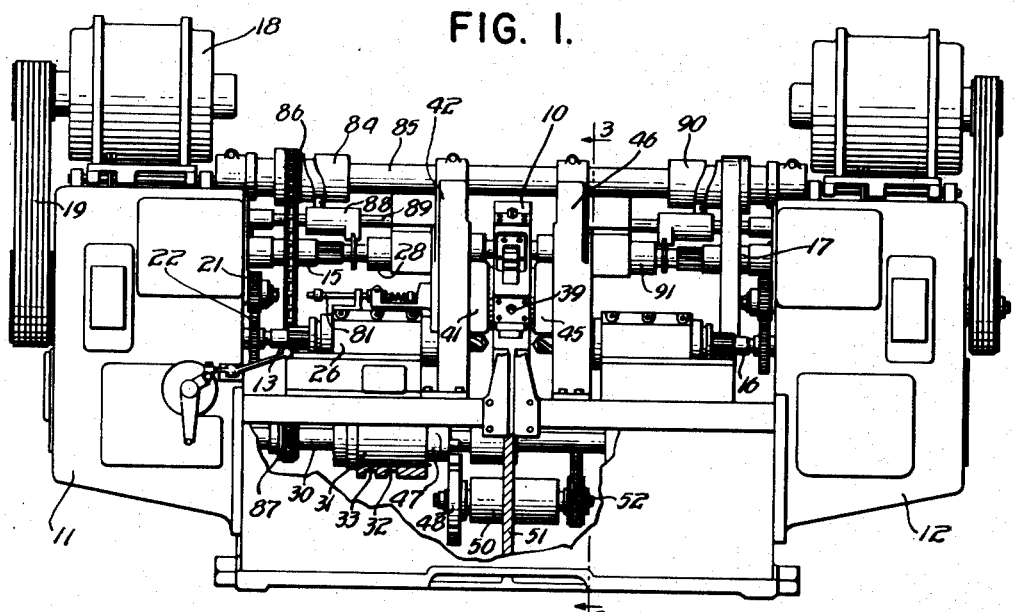
FIG. 1.
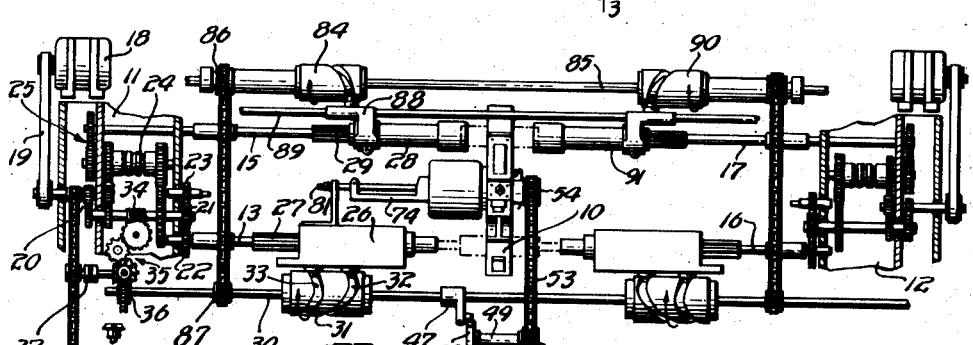
FIG. 2.
FIG. 3.
INVENTOR
DONALD H. MONTGOMERY
BY
ATTORNEYS Oct. 27, 1953   D. H. MONTGOMERY   2,656,587
MACHINE TOOL
Filed May 14, 1948   3 Sheets-Sheet 3
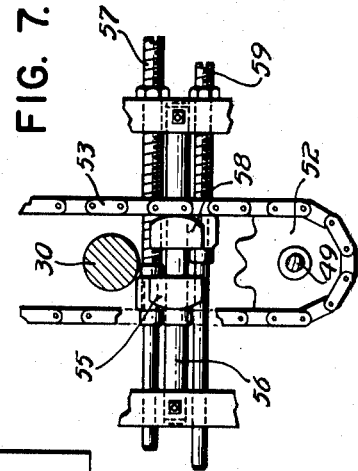
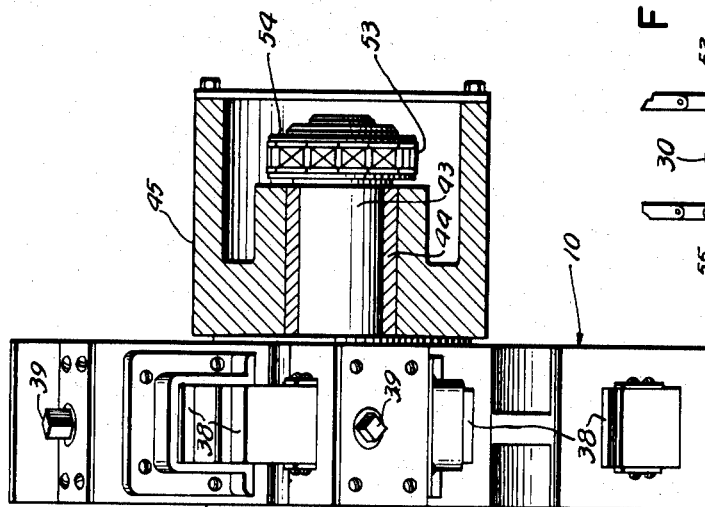
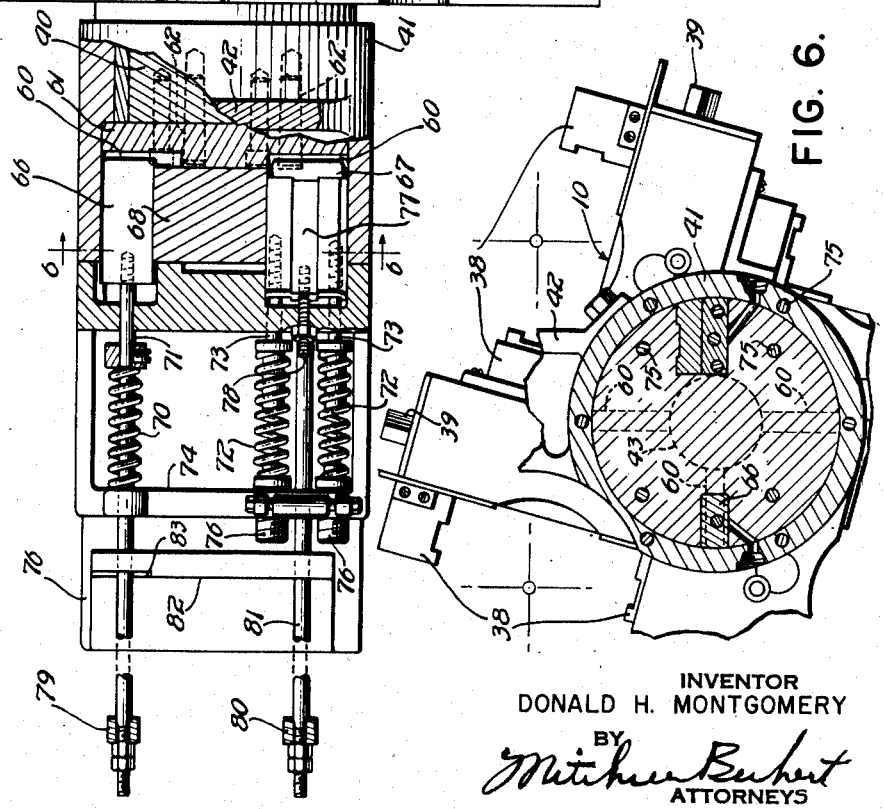
INVENTOR
DONALD H. MONTGOMERY
BY
ATTORNEYS Patented Oct. 27, 1953

2,656,587

UNITED STATES PATENT OFFICE 2,656,587

MACHINE TOOL

Donald H. Montgomery, West Hartford, Conn., assignor to The New Britain Machine Company, New Britain, Conn., a corporation of Connecticut Application May 14, 1948, Serial No. 26,945

9 Claims. (Cl. 29—50)

My invention relates to an automatic indexing machine and in particular to a multiple-spindle chucking machine.

It is an object of the invention to provide an improved machine of the character indicated.

It is another object to provide an improved indexing mechanism for a machine of the character indicated, having increased rigidity, and adapted particularly for high-speed operation.

It is also an object to provide an improved locating and locking mechanism for the indexed parts of a machine of the character indicated.

It is a further object to provide an improved tool-slide feed means in a machine of the character indicated.

It is a general object to meet the above objects with simplified mechanisms providing maximum accessibility to working areas and reducing overall space requirements for machines of a given capacity.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a front view in elevation of an automatic multiple-spindle chucking machine incorporating features of the invention;

Fig. 2 is a schematic representation of working parts within a machine of Fig. 1;

Fig. 3 is a generally sectional view taken substantially in the plane 3—3 of Fig. 1, with some frame elements removed in order better to show working elements of the machine;

Fig. 5 is another view of the elements of Fig. 4, partly sectioned substantially in the plane 5—5 of Fig. 3;

Fig. 6 is a fragmentary detail, partly sectioned in the plane 6—6 of Fig. 5; and Fig. 7 is another fragmentary detail illustrating a part of the indexing mechanism.

Figure 4:
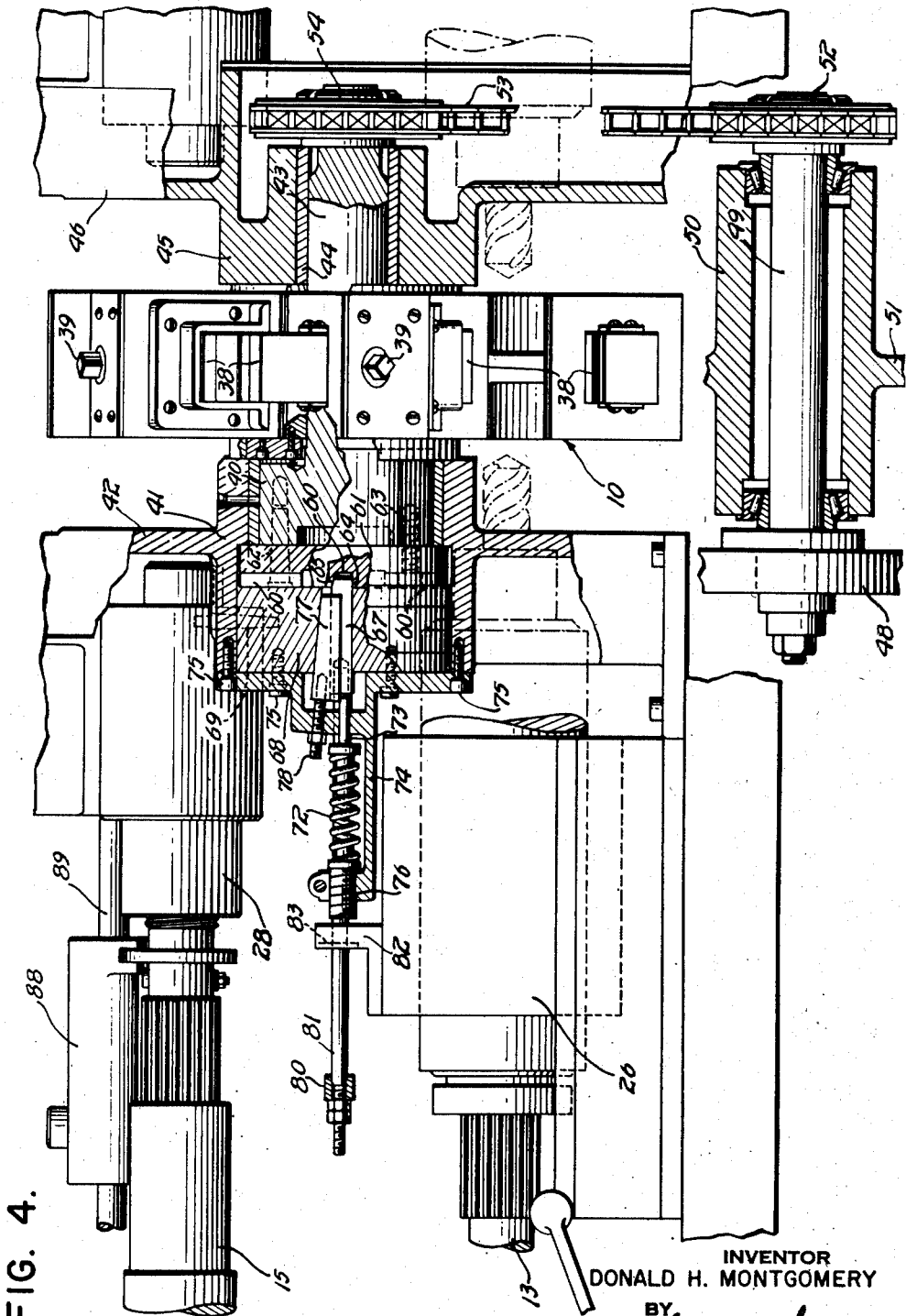
Fig. 4 is an enlarged partly broken away view of certain elements relating to the turret mechanism in the machine of Fig. 1, parts being sectioned more or less in the vertical plane 4—4 of Fig. 3.

Briefly stated, my invention contemplates an improved machine of the character indicated, wherein a turret may be positively indexed, located, and locked in indexed position with a minimum of play and yet with a minimum consumption of space in the working area adjacent the turret. In the form to be described, indexing is accomplished by a chain drive direct to the turret, and locating and locking means are engageable directly with the turret and may be operated by lost-motion connection to a slide or other element movable with one of the spindles of the machine.

Referring to the drawings, my invention is shown in application to a double-ended multiple-spindle tool-rotating automatic chucking machine including a centrally located turret 10 indexible about a longitudinally extending axis. Power cases 11—12 at opposite ends of the machine may carry the gears and other drive mechanisms for one plurality of spindles 13—14—15 facing the turret 10 from one end of the machine, and for another plurality of spindles 16—17 facing the turret 10 from the other end of the machine. Power may be provided independently at each end of the machine, for separately driving each said plurality of spindles 13—14—15 and 16—17. For power case 11 a motor 18 may be connected by belt means 19 to a first gear train 20, which may drive a pinion 21 meshing simultaneously with the gear 22 for spindle 13 and with the gear 23 for spindle 14 (not shown in Fig. 2). Since it may be desirable in some applications to employ the upper spindle 15 for threading purposes, I provide clutch means 24 for selecting forward and reverse connections through change gears 25 to the upper spindle 15. Similar clutch and gear connections may be employed within the power case 12 for driving spindles 16—17 at the other end of the machine, as will be clear.

In the form shown, each spindle carries a slide including a member to be longitudinally reciprocated and to carry a tool for engagement with work held in the turret 10. In the case of spindle 13, a slide 26 includes rotating parts engaged to the spindle 13 through spline means 27. A similar slide (not shown) may be employed for the spindle 14; in the case of the upper spindle 15, a slide 28 may be connected to spindle 15 by a spline 29. Feeding for the various slides may be timed from a main camshaft 30 beneath the lower spindles, and in the form shown the camshaft 30 extends substantially the length of the machine to serve feed cams for spindles at both ends of the machine. A first feed cam 31 may serve both the feed slide 26 for spindle 13 and the feed slide for spindle 14; and, if separate feeds are desired for these two slides, separate cam grooves 32—33 may be provided. The main camshaft may be driven at relatively low speed by worm means 34, change gears 35, and a second worm 36; or, for relatively fast feeding operations, as when jumping the tools into the work, a high-speed sprocket drive may be engaged, as at the clutch 37, momentarily to overrun the relatively slow speed drive.

In the form shown, the turret 10 incorporates a plurality of independent chucks one for each indexed station, and to permit loading there is one more chuck station than there are spindle stations at each end of the machine. Each chuck may comprise two jaws 38 oppositely propelled upon operation of an adjusting screw-head 39. The turret itself may be secured to a supporting shaft having an enlarged or flanged end 40 to derive bearing support in a hub 41, which may be formed in a frame upright 42 securely anchored to the base of the machine. The other end 43 of the turret-supporting shaft may be spaced by a bushing 44 within a hub 45, similar to the hub 41 and formed in another frame member 46 anchored to the base of the machine.

In accordance with the invention, I provide an improved means for indexing the turret 10 with minimum play and with minimum consumption of space in the working area around the turret. Such indexing means may include a Geneva mechanism operating in timed relation with the cam means for the various tool slides, and in the form shown, a Geneva arm 47 is pinned to the main camshaft 30 almost directly beneath turret 10. A Geneva or star wheel 48 may be mounted on a separate shaft 49 journalled in bearing means 50 solidly fixed to the frame 51 of the base, and a sprocket wheel 52 on the Geneva shaft 49 may drive a chain 53 to another sprocket wheel 54 on one end of the turret-supporting shaft 43.

With the described arrangement, it will be appreciated that a direct relation is maintained between the turret 10 and the Geneva mechanism which supplies the indexing motion. To assure that indexing functions may take place with a minimum of play, chain-tightener means may be interposed between the Geneva shaft 49 and the main camshaft 30. In the form shown (see Fig. 7), a first chain-tightening shoe 55 is slidable on a fixed bar 56 under the propelling action of an adjustable screw 57 to tighten one side of the chain, and on the other side of chain 53 a second shoe 58 may also be slidable on the bar 56, under the influence of an adjusting screw 59 (see Fig. 7).

To assure accurate location of indexed stations on the turret 10 with each indexing operation, I provide for locating and locking the turret 10 directly and with a relatively simple mechanism which may be actuated upon a relative longitudinal movement of the turret and one of the spindles with respect to each other. In the form shown, the turret is axially fixed and the spindles are fed; the locating and locking means may, therefore, be operated by means movable with one of the spindles.

The locating and locking means is preferably longitudinally reciprocable, and in the form shown is serially engageable with the various radial slots or grooves 60 in a locking plate 61, which may be carried with the turret-supporting shaft 43. A tapered pin 62 may serve positively to locate the plate 61 with respect to the flanged shaft end 40, and a plurality of screws 63 may permanently secure this relationship. Each of the radial slots or grooves 60 may be served by both the locating and the locking means, and I prefer only to provide one slot 60 for each indexed position. In the form shown, there are four turret chucking stations and, therefore, four equally spaced radial grooves 60. Each of the grooves 60 preferably includes relatively tapered side walls; for each groove 60, one wall 64 may be formed in a longitudinally extending plane, and the other wall 65 may diverge outwardly from such a plane.

For any one indexed position of the turret 10, I employ a longitudinally slidable locating member 66 to engage one of the slots 60, while a longitudinally slidable locking member 67 is employed to engage another slot 60. Both locating and locking members 66—67 may be guidingly supported in a fixed guide block 68, which may be effectively a part of the frame of the machine. The guide block 68 may be accurately aligned and held in alignment by means of a tapered plug 69 between the hub 41 and the block 68.

The locating and locking elements 66—67 are preferably normally resiliently urged toward locating and locking engagement with the turret 10. Such resilient forces may be applied by a compression spring 70 to a rod 71 attached to the locating member 66, and by means of dual springs 72 and push rods 73 to the locking member 67. A bracket 74 may serve to support the relatively fixed ends of the springs 70—72 and may be clamped, as by screws 75, to the guide block 68 and to the hub 41, as will be clear. If desired, adjustable abutments in the form of screws 76 may be threaded in the back end of the bracket 74 for an engagement with the locking springs 72, for adjustment of locking forces as may be required. In order to assure that there will be no play in the locking bar 67 a tapered shim 77 may be adjustably positioned, as by a lock nut and screw 78 alongside the locking member 67.

In accordance with a feature of the invention, the locating and locking mechanism may be very simply actuated by a lost-motion connection between each of these mechanisms and means longitudinally movable with one of the spindles, say the slide 26 for the spindle 13. For actuating purposes, an adjustably positioned stop 79 may be carried at the rearwardly extended end of the locating rod 71, and a similar stop 80 may be carried by a rod 81 secured to the locking element 67. Both rods 71—81 may be guidingly supported by a bracket 82 carried on the slide 26, so that upon drawback of the slide 26 the bracket 82 may intercept first the locking stop 80 and then the locating stop 79, for the sequential withdrawal of locking and locating members 67—66. In the form shown, the bracket 82 is recessed at 83 so as to assure the desired sequence of engagements of stops 79—80. It will be clear that when the slide 26 is advanced, that is, at the commencement of a feeding operation and immediately following an indexing operation, stop 79 may be released first, so that the locating function may precede the locking function. With a suitable adjustment of springs 72, it will be clear that the turret 10 may be very adequately locked while the working functions proceed for each indexed position.

In accordance with a further feature of the invention, I provide relatively compact means for timing the feed of the upper spindles, such as the slide 28 for the spindle 15. In accordance with this feature, an upper feed cam 84 may be revolubly mounted on a fixed bar 85, anchoring both ends of the machine together and also anchoring the upright members 42—46. The cam 84 may be locked to a sprocket wheel 86, which may be chain connected to a similar sprocket wheel 87 on the main camshaft 30. The cams 84 and 31 may thus be rotated in a 1:1 relation, and, if desired, chain-tightening means may be employed as shown in Fig. 7. The program of cam 84 may be followed by a cam-follower slide mounted on a guide rod 89 secured to the frame of the machine, and it may extend in actuating relation with the slide 28. In a similar manner, it will be understood that a further overhead cam 90 for the slide 91 on spindle 17 may be operated in timed relation with the feed slides for other spindles.

It will be seen that I have described an ingenious compact and rigid means for more effectively operating a machine of the character indicated, especially at high speeds. Indexing moments for a chucking turret may be applied directly at the turret, thus reducing possibility of play in the indexing operation. Locating and locking functions may be efficiently performed without the need for special cams and other controls, and an improved means for tool-slide feed from auxiliary overhead cam means has been disclosed.

While I have described my invention in detail for the preferred form shown, it will be understood that modifications may be made within the scope of the invention as defined in the claims which follow.

I claim:

1. In a machine of the character indicated, an indexible turret, a plurality of spindles facing said turret, means generally longitudinally movable with one of said spindles, indexing means for said turret and driven in timed relation with longitudinal movement of said one spindle, longitudinally reciprocable locating means engageable with said turret for locating an indexed position of said turret, longitudinally reciprocable locking means for locking a located indexed position of said turret, and means connecting said locking means and said locating means to said longitudinally movable means.

2. A machine according to claim 1, in which resilient means normally urges both said locating means and said locking means in a direction of locating and locking engagement with said turret.

3. A machine according to claim 1, in which said last-defined means includes a first lost-motion connection between said locating means and said longitudinally movable means and a second lost-motion connection between said locking means and said longitudinally movable means, there being greater lost motion in said first connection than in said second connection, whereby upon a withdrawal of said longitudinally movable means said locking means will be drawn back out of engagement with said turret prior to disengagement of said locating means from said turret, and whereby upon a feed of said longitudinally movable means said locating means may engage said turret prior to a locking engagement.

4. In a machine of the character indicated, a frame, a turret, bearings in said frame for journalling said turret in said frame, indexing means for said turret, locking means for said turret including a member longitudinally slidable within one of said bearings and lockingly engageable with a journalled end of said turret, cover means for said one bearing, a part of said locking means extending outside said cover means, and means for actuating said locking means in timed relation with operation of said indexing means, whereby the operation of locking said turret may proceed unhampered by chips.

5. In a machine of the character indicated, a turret indexible on a longitudinally extending axis, a plurality of spindles on longitudinally aligned axes at one longitudinal end of said machine and facing said turret, a plurality of spindles on longitudinally aligned axes at the other longitudinal end of said machine and facing said turret, the spindles of each said plurality including a lower spindle below the axis of said turret and an upper spindle above the axis of said turret, longitudinally guided slide means for said lower spindle and below the axis of said turret and longitudinally guided slide means for said upper spindle and above the axis of said turret, a single lower longitudinally aligned camshaft below said turret, said lower camshaft including lower drum cams with longitudinal throws and respectively positioned adjacent both said lower slide means, a single upper longitudinally aligned camshaft above said turret, said upper camshaft including upper drum cams with longitudinal throws and respectively positioned adjacent both said upper slide means, cam-follower means carried by said slides and respectively cooperating with adjacent drum cams, drive means for one of said camshafts, a sprocket connection between said camshafts, and indexing means for said turret including a Geneva mechanism directly driven by said one camshaft.

6. A machine according to claim 5, in which separate sprocket means connect said camshafts at both longitudinal ends thereof.

7. A machine according to claim 5, and including longitudinally movable locking means for said turret, and a longitudinally acting actuating connection between one of said slides and said locking means.

8. In a machine of the character indicated, a turret indexible on a longitudinally extending axis and located intermediate the ends of said machine, a first plurality of spindles facing said turret from one end of said machine, a second plurality of spindles facing said turret from the other end of said machine, a main longitudinally extending camshaft radially outside said turret and longitudinally overlapping spindles of both said pluralities, feed means for said spindles including separate actuating cams on said camshaft for spindles of each said plurality; and indexing means including a Geneva arm secured to said camshaft at a location longitudinally intermediate said cams, a Geneva wheel driven by said arm and mounted on an axis radially offset from said turret axis, and a chain connection from said Geneva wheel to said turret at a location longitudinally between each said plurality of spindles.

9. In a machine of the character indicated, a frame including fixed elongated guide means, a turret indexibly supported by said frame, slide means longitudinally reciprocably guided by said guide means, a spindle journalled in said slide means on an axis generally parallel to said guide means and facing said turret, actuating means for reciprocating said slide means to feed said spindle journalled therein, indexing means for said turret driven in timed relation with said slide-actuating means, locating means for locating an indexed position of said turret, said locating means including a frame-guided locating member with an elongated actuating portion longitudinally overlapping a part of said slide means, spring means urging said locating member toward turret-locating position, an actuating abutment on said part of said slide means, said abutment slidably embracing said actuating portion of said locating means, and a lost-motion connection between said abutment and said actuating portion of said locating member.

DONALD H. MONTGOMERY.

References Cited in the file of this patent

UNITED STATES PATENTS

| Number | Name | Date |
|---|---|---|
| 673,015 | Castle | Apr. 30, 1901 |
| 1,398,226 | Fretter | Nov. 29, 1921 |
| 1,540,899 | Muller | June 9, 1925 |
| 1,918,538 | Hallenbeck | July 18, 1933 |
| 2,060,158 | Yager et al. | Nov. 10, 1936 |
| 2,060,159 | Yager et al. | Nov. 10, 1936 |
| 2,080,157 | Yager et al. | May 11, 1937 |